US 12,341,450 B2

(12) United States Patent
Inoue et al.

(10) Patent No.: US 12,341,450 B2
(45) Date of Patent: Jun. 24, 2025

(54) ABNORMALITY DIAGNOSIS DEVICE AND ABNORMALITY DIAGNOSIS METHOD

(71) Applicants: Mitsubishi Electric Corporation, Tokyo (JP); MITSUBISHI ELECTRIC RESEARCH LABORATORIES, INC., Cambridge, MA (US)

(72) Inventors: Hiroshi Inoue, Tokyo (JP); Bingnan Wang, Cambridge, MA (US); Lei Zhou, Cambridge, MA (US)

(73) Assignees: MITSUBISHI ELECTRIC CORPORATION, Tokyo (JP); MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 309 days.

(21) Appl. No.: 18/071,708

(22) Filed: Nov. 30, 2022

(65) Prior Publication Data

US 2024/0178776 A1 May 30, 2024

(51) Int. Cl.
*H02P 21/22* (2016.01)
*H02P 29/028* (2016.01)

(52) U.S. Cl.
CPC ............ *H02P 21/22* (2016.02); *H02P 29/028* (2013.01); *H02P 2205/01* (2013.01)

(58) Field of Classification Search
CPC ..... H02P 21/22; H02P 29/028; H02P 2205/01
See application file for complete search history.

(56) References Cited

U.S. PATENT DOCUMENTS

| 7,075,327 | B2 * | 7/2006 | Dimino .............. G05B 23/0229 |
| | | | 702/183 |
| 7,275,009 | B2 * | 9/2007 | Yasukawa ................ B41J 29/38 |
| | | | 702/115 |
| 8,355,145 | B2 * | 1/2013 | Motoyama ............. G03G 15/55 |
| | | | 358/1.14 |
| 8,692,400 | B2 * | 4/2014 | Lee .......................... H02P 9/02 |
| | | | 290/44 |
| 11,953,555 | B2 * | 4/2024 | Kanemaru ........... G01R 31/343 |
| 2020/0217895 | A1 * | 7/2020 | Kanemaru ............ H02P 29/027 |

FOREIGN PATENT DOCUMENTS

| JP | 2015-227889 A | 12/2015 |
| JP | 2017-181437 A | 10/2017 |
| WO | 2019/082277 A1 | 5/2019 |

* cited by examiner

*Primary Examiner* — Thai T Dinh
(74) *Attorney, Agent, or Firm* — XSENSUS LLP

(57) ABSTRACT

An abnormality diagnosis device includes: a first interface to obtain a value of a driving current for driving a motor; and a processor to access a database including calculation data to be used to calculate a degree of abnormality of the motor, wherein the processor extracts a feature quantity for calculating the degree of abnormality from a current waveform specified by a value of the driving current, and calculates the degree of abnormality of the motor based on the extracted feature quantity and the calculation data.

13 Claims, 11 Drawing Sheets

ABNORMALITY DIAGNOSIS DEVICE AND ABNORMALITY DIAGNOSIS METHOD

BACKGROUND OF THE INVENTION

Field of the Invention

The present disclosure relates to an abnormality diagnosis device and an abnormality diagnosis method, more particularly, an abnormality diagnosis device and an abnormality diagnosis method for a motor.

Description of the Background Art

Conventionally, there has been a technique of diagnosing an abnormality of a motor using a current spectrum obtained by performing fast Fourier transform onto a current signal during an operation of the motor. Japanese Patent Laying-Open No. 2017-181437 discloses a technique of performing an FFT analysis onto a current of a motor to diagnose an abnormality based on a comparison between a signal intensity of a specific frequency of a spectrum peak and a reference value.

SUMMARY OF THE INVENTION

However, in this type of conventional diagnosis technique, only a determination result indicating whether or not an abnormality has occurred in the motor is output, and information by which a degree of abnormality can be known is not provided.

The present disclosure has been made in view of the above-described problem, and has an object to provide information by which a degree of abnormality of a motor can be known.

An abnormality diagnosis device according to the present disclosure is an abnormality diagnosis device for diagnosing an abnormality of a motor, the abnormality diagnosis device including: a first interface to obtain a value of a driving current for driving the motor; and a processor to access a database including calculation data to be used to calculate a degree of abnormality of the motor, wherein the processor extracts a feature quantity for calculating the degree of abnormality from a current waveform specified by a value of the driving current, and calculates the degree of abnormality of the motor based on the extracted feature quantity and the calculation data.

A method of the present disclosure is an abnormality diagnosis method for diagnosing an abnormality of a motor by a computer, the abnormality diagnosis method including: obtaining a value of a driving current for driving the motor; accessing a database including calculation data to be used to calculate a degree of abnormality of the motor; and extracting a feature quantity for calculating the degree of abnormality from a current waveform specified by a value of the driving current, and calculating the degree of abnormality of the motor based on the extracted feature quantity and the calculation data.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
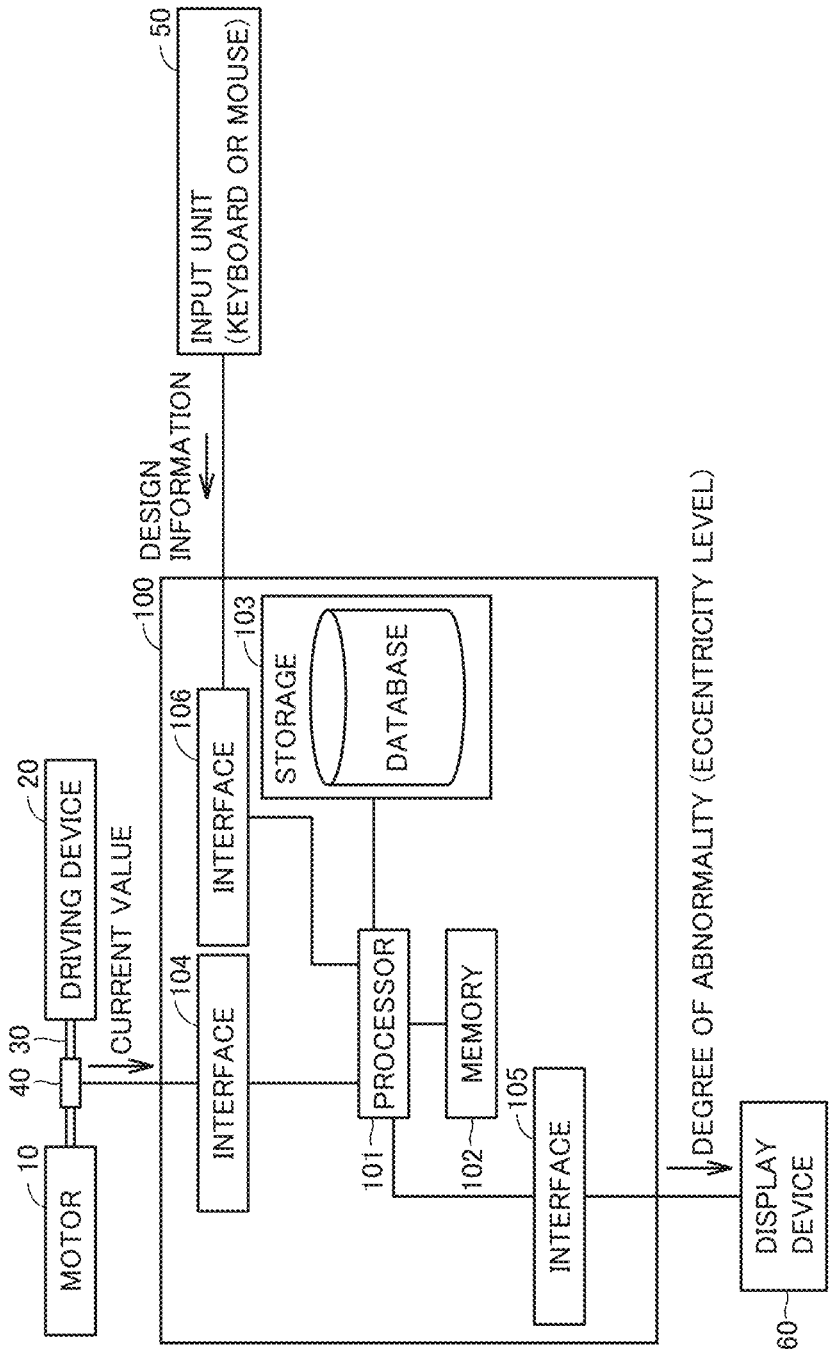
FIG. 1 is a block diagram showing a configuration of an abnormality diagnosis device according to a first embodiment.

Hereinafter, embodiments will be described with reference to figures. It should be noted that in the figures, the same or corresponding portions are denoted by the same reference characters, and will not be described repeatedly.

First Embodiment (Definition of Degree of Abnormality)

First, a degree of abnormality of a motor in the present disclosure is defined. Examples of items by which a degree of abnormality of a motor can be estimated include: eccentricity associated with an air gap; imbalance causing a heavy weight at a certain angle of a rotor of the motor; loosening of a bolt that fixes the motor to a surface plate (floor); and the like. Among these items, an eccentricity level is employed as an exemplary degree of abnormality in the present disclosure. In the present disclosure, it is contemplated to employ, as the degree of abnormality, an item other than the eccentricity level such as the above-described imbalance and loosening of a bolt.

The term "eccentricity" means that the rotor of the motor is displaced with respect to an axis to change the air gap between the rotor and the stator of the motor. The eccentricity level is defined by the following formula (1) when a design value of the gap is represented by $gap_0$ (mm) and the gap is represented by gap (mm):

$$\text{Eccentricity level}(\%) = \frac{\text{gap(mm)} - \text{gap}_0\text{(mm)}}{\text{gap}_0\text{(mm)}} * 100 \qquad (1)$$

Here, a displacement in a stationary state is defined as static eccentricity, whereas a displacement caused by swinging of the rotor during rotation is defined as dynamic eccentricity. It should be noted that the term "displacement" means that the center of the stator and the center of the rotor are displaced from each other to result in a non-uniform space between the stator and the rotor.

(Configuration of Abnormality Diagnosis Device)

FIG. 1 is a block diagram showing a configuration of an abnormality diagnosis device 100 according to a first embodiment. Abnormality diagnosis device 100 includes a processor 101, a memory 102, a storage 103, and interfaces 104 to 106.

Interface 104 is connected to a current sensor 40. Current sensor 40 detects a current value of a driving current supplied from driving device 20 to motor 10. Current sensor 40 is attached to a power supply cable 30 that connects driving device 20 and motor 10 to each other.

Here, a three-phase induction machine is exemplified as an exemplary motor 10. However, an inverter-driving motor, a DC motor, a synchronous motor, a servo motor, and the like are also applicable in the present disclosure. Current sensor 40 detects, for example, a waveform of a u-phase current of three-phase current. Processor 101 obtains, via interface 104, the current waveform detected by current sensor 40. It should be noted that current sensor 40 may detect a current waveform of a current of any phase of the three-phase current.

Interface 105 is connected to a display device 60. Processor 101 displays various pieces of display information such as a degree of abnormality of motor 10 on display device 60 via interface 105. Abnormality diagnosis device 100 may be configured to include display device 60. For example, abnormality diagnosis device 100 may be integrally provided with a monitor serving as an exemplary display device 60.

Interface 106 is connected to an input unit 50 constituted of a keyboard, a mouse, and the like. Via interface 106, processor 101 obtains design information of motor 10 input from input unit 50. Abnormality diagnosis device 100 may be configured to include input unit 50.

Processor 101 is an exemplary "computer". Processor 101 is constituted of, for example, a CPU (Central Processing Unit), an FPGA (Field Programmable Gate Array), or the like. Processor 101 may be constituted of a processing circuitry such as an ASIC (Application Specific Integrated Circuit).

Memory 102 is constituted of a volatile memory such as a DRAM (Dynamic Random Access Memory) or an SRAM (Static Random Access Memory), and a nonvolatile memory such as a ROM (Read Only Memory). Memory 102 may be an SSD (Solid State Drive), an HDD (Hard Disk Drive), or the like. Memory 102 stores programs and calculation data to be used by processor 101 to calculate the degree of abnormality of motor 10.

A database is constructed in storage 103. The database stores eccentricity level calculation data to be used by processor 101 when calculating the degree of abnormality of motor 10.

Processor 101 can switch a control mode between a "learning mode" for constructing the database in storage 103 and a "diagnosis mode" for calculating the degree of abnormality of motor 10 using the database.

In the learning mode, processor 101 generates the eccentricity level calculation data using the design information of motor 10, and registers the generated eccentricity level calculation data in the database. In the diagnosis mode, processor 101 calculates the eccentricity level of motor 10 using the eccentricity level calculation data registered in the database and the current waveform detected by current sensor 40. Processor 101 displays the calculated eccentricity level as the degree of abnormality on display device 60.

Figure 2:
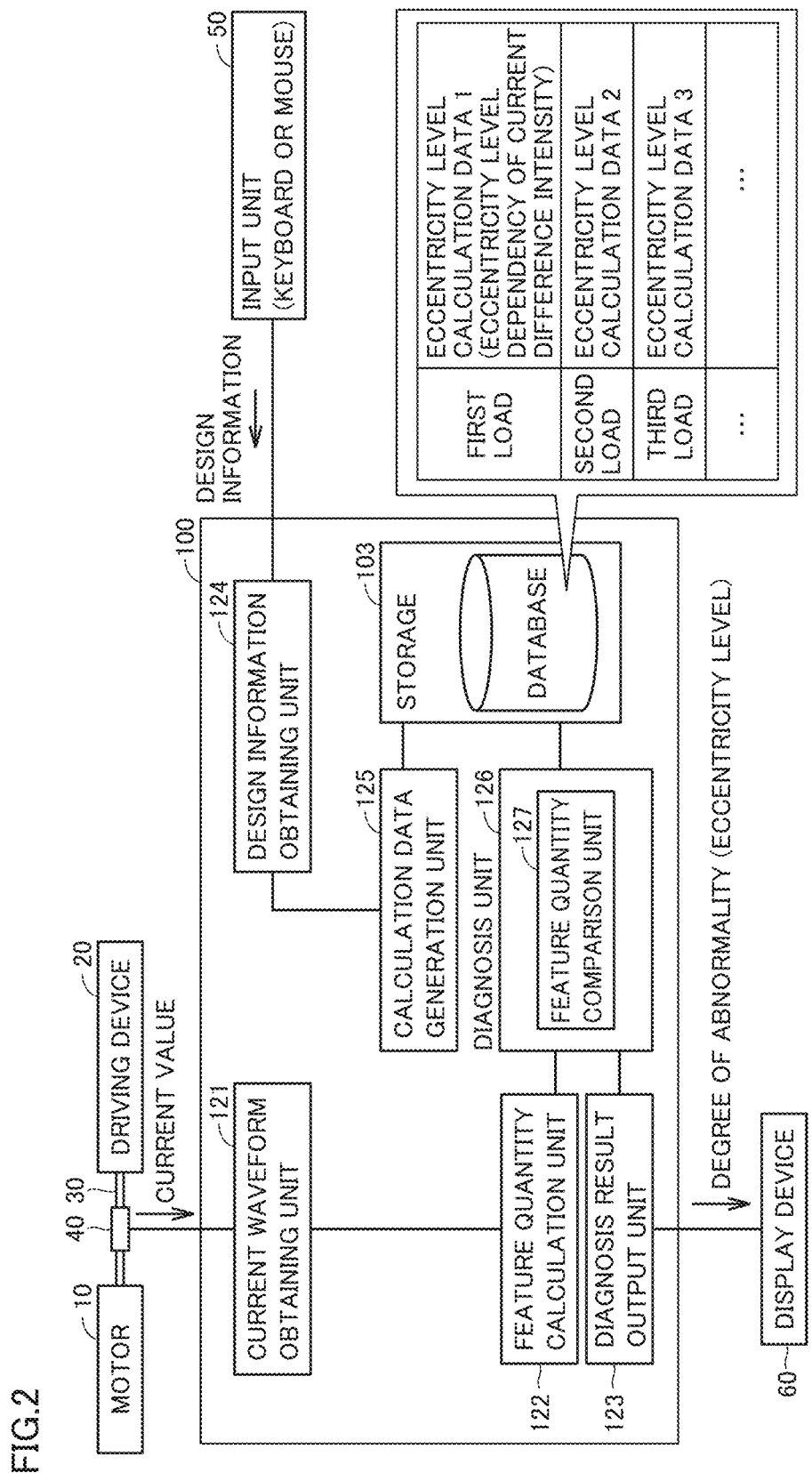
FIG. 2 is a block diagram showing a functional configuration of the abnormality diagnosis device according to the first embodiment.

FIG. 2 is a block diagram showing a functional configuration of abnormality diagnosis device 100 according to the first embodiment. Referring to FIG. 2, abnormality diagnosis device 100 includes a current waveform obtaining unit 121, a feature quantity calculation unit 122, a diagnosis result output unit 123, a design information obtaining unit 124, a calculation data generation unit 125, and a diagnosis unit 126. Diagnosis unit 126 includes a feature quantity comparison unit 127. These are implemented by processor 101, memory 102, and interfaces 104 to 106 shown in FIG. 1.

Design information obtaining unit 124 obtains the design information of motor 10 from input unit 50. The design information includes an air gap, a winding wire of the stator, a rotor bar, a motor size, resistances of the rotor and the stator, the number of turns, and magnetic susceptibility. Calculation data generation unit 125 generates the eccentricity level calculation data for each load of motor 10 using the design information. Calculation data generation unit 125 registers, in the database of storage 103, the calculated eccentricity level calculation data for each load. As a result, as shown in FIG. 2, the respective pieces of eccentricity level calculation data for the loads are accumulated in the database. As described below with reference to FIG. 5, each of respective pieces of eccentricity level calculation data 1, 2, 3, . . . represents eccentricity level dependency of a current difference intensity. In other words, each of the respective pieces of eccentricity level calculation data 1, 2, 3, . . . is data indicating a relation between a feature quantity and a degree of abnormality.

Current waveform obtaining unit 121 obtains, from current sensor 40, the waveform of the u-phase current for driving motor 10. Feature quantity calculation unit 122 calculates the feature quantity using the current waveform obtained by current waveform obtaining unit 121.

Figure 3:
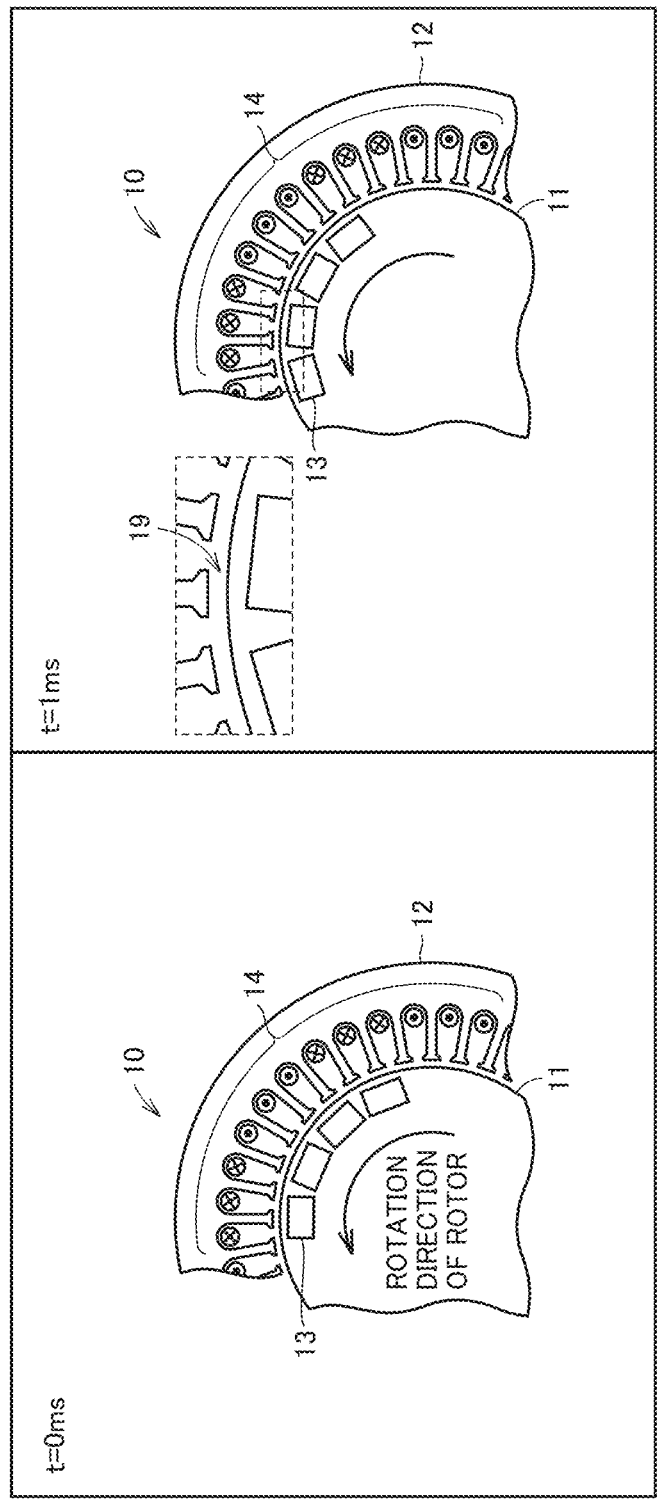
FIG. 3 is a diagram showing a positional relation between rotor bars and winding wires when a motor is being driven.
Figure 4:
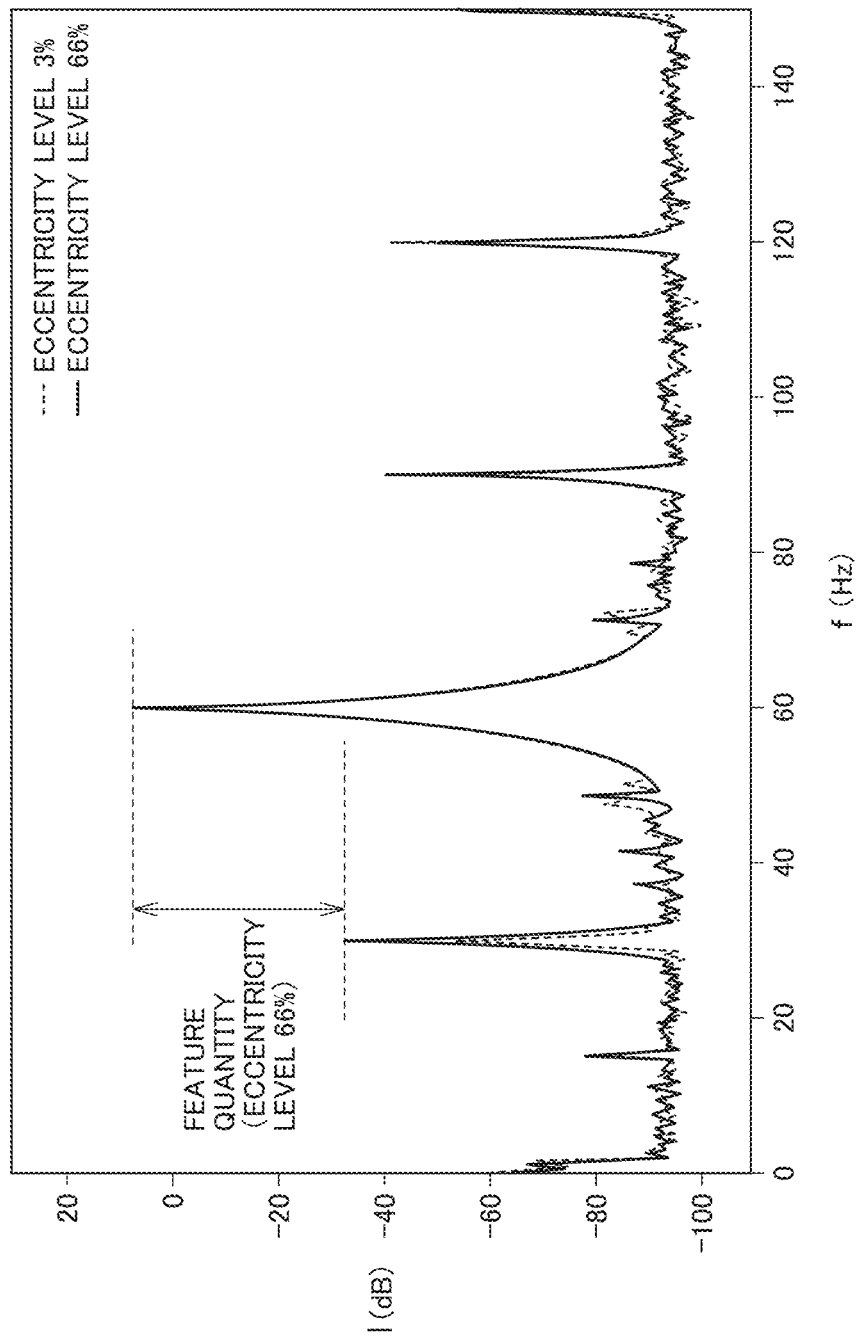
FIG. 4 is a diagram showing an exemplary FFT analysis result.

Here, the following describes a method of calculation by feature quantity calculation unit 122 with reference to FIGS. 3 and 4. FIG. 3 is a diagram showing a positional relation between rotor bars 13 and winding wires 14 when motor 10 is being driven. FIG. 4 is a diagram showing an exemplary FFT analysis result.

In FIG. 3, motor 10 includes a rotor 11, a stator 12, a plurality of rotor bars 13, and a plurality of winding wires 14. FIG. 3 shows that a positional relation between rotor bars 13 and winding wires 14 is changed between a time t=0 ms and a time having elapsed by 1 ms from the foregoing time.

Here, as a representative example of the method of calculating the feature quantity, the following describes a method of calculating a feature quantity using a frequency component. First, feature quantity calculation unit 122 converts, into a frequency domain, the current waveform of the u-phase current obtained by current waveform obtaining unit 121. Feature quantity calculation unit 122 converts the current waveform into the frequency domain using, for example, a FFT (Fast Fourier Transform) analysis method. As shown in FIG. 4, frequency dependency is observed in the u-phase current, and a large peak is generated in a spectrum intensity at a power supply frequency. A sideband wave is observed at each of left and right positions beside the peak.

When rotor 11 is vibrated, an air gap 19 between rotor 11 and stator 12 is periodically changed. Thus, a magnetic flux density between rotor 11 and stator 12 is changed. The change in magnetic flux density causes a change in current, and this change is reflected in the sideband wave. In view of the above, the component value (spectrum intensity) of the sideband wave is employed as the feature quantity to be used for diagnosis of the degree of abnormality in the present embodiment.

The frequency of the sideband wave is determined from the design information of motor 10. Rotation frequency $f_i$ of one of the plurality of sideband waves will be exemplified. When the power supply frequency is represented by $f_s$, the number of poles is represented by p, and slip is represented by s, rotation frequency $f_i$ of the sideband wave is expressed by the following formula (2):

$$f_i = f_s \pm \frac{2(1-s)}{p} \quad (2)$$

Since the rotation frequency is likely to be affected by the vibration of rotor 11, the value (spectrum intensity) of the frequency component is increased whenever the eccentricity is progressed. Therefore, the rotation frequency component can be handled as an index indicating a degree of progress of eccentricity. When the rotation frequency component is used as the index indicating the degree of progress of eccentricity, any of a high-frequency side rotation frequency component, a low-frequency side rotation frequency component, and a rotation frequency component having an average value of the a high-frequency side rotation frequency component and the low-frequency side rotation frequency component may be used as the rotation frequency component. The degree of progress of eccentricity may be diagnosed using the current difference intensity that represents a difference between the frequency component of the power supply frequency and the rotation frequency component of the sideband wave.

As described above, feature quantity calculation unit 122 calculates the feature quantity by, for example, performing an FFT (Fast Fourier Transform) analysis on the current waveform. Diagnosis unit 126 calculates the degree of abnormality (eccentricity level) of motor 10. On this occasion, feature quantity comparison unit 127 included in diagnosis unit 126 compares the feature quantity with the eccentricity level calculation data in the database.

Figure 5:
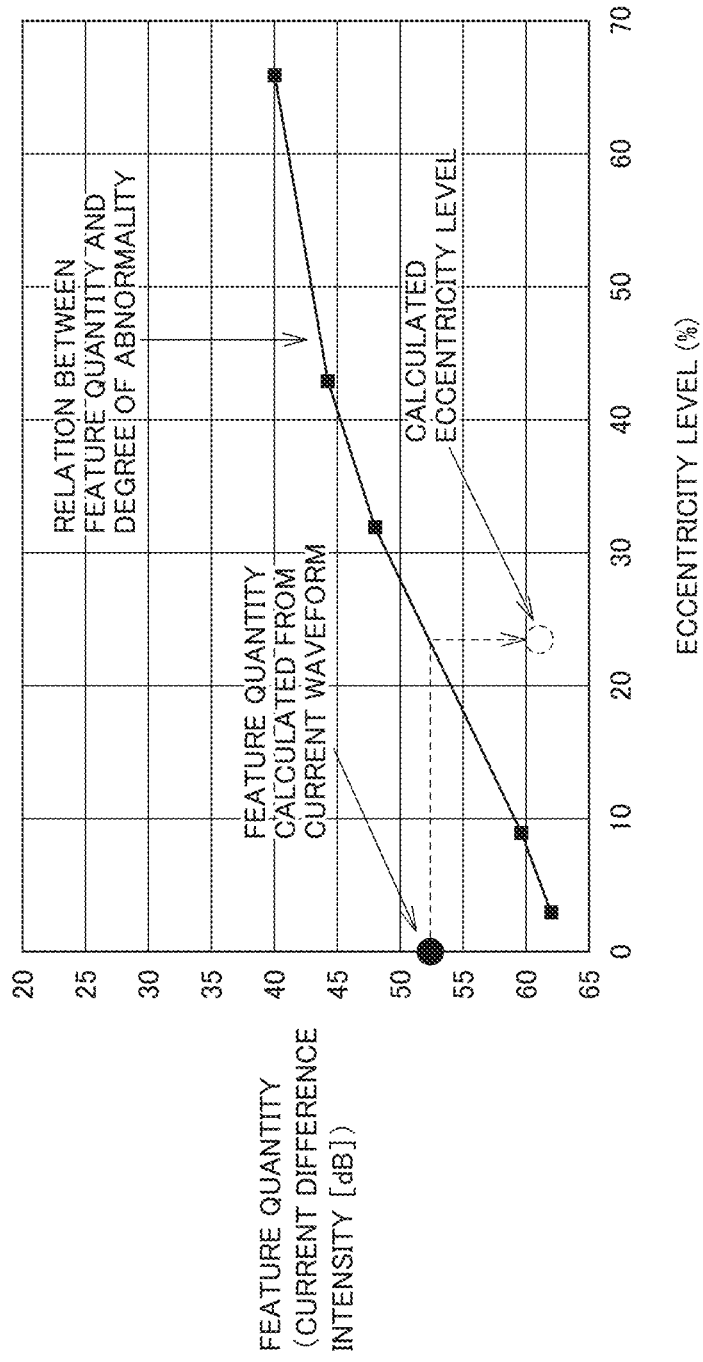
FIG. 5 is a graph showing exemplary eccentricity level calculation data.

Here, referring to FIG. 5, the following describes a method of calculating the degree of abnormality (eccentricity level) of motor 10 using the eccentricity level calculation data. FIG. 5 is a graph showing exemplary eccentricity level calculation data. The graph shown in FIG. 5 shows eccentricity level dependency of the current difference intensity. In other words, the graph shown in FIG. 5 illustrates a function indicating a relation between the feature quantity and the degree of abnormality (eccentricity level). This function corresponds to the eccentricity level calculation data registered in the database. The database stores such a function for each load of motor 10.

Diagnosis unit 126 inputs the feature quantity (current difference intensity) calculated by feature quantity calculation unit 122 to the current difference intensity of the function shown in FIG. 5. Thus, an eccentricity level corresponding to the input value is calculated. Diagnosis result output unit 123 outputs the calculated degree of abnormality to display device 60. It should be noted that as another candidate for the feature quantity, a current value at the rotation frequency (no difference is calculated) can be employed. However, the current value at the rotation frequency is effective as the feature quantity only when fluctuation of the effective current value over time is sufficiently small. This is due to the following reason: when a current value at the power supply frequency is fluctuated, an influence thereof cannot be taken into consideration.

In this way, in the present embodiment, the degree of abnormality (eccentricity level) is calculated based on the current waveform obtained from current sensor 40.

(Diagnosis Mode)

Figure 6:
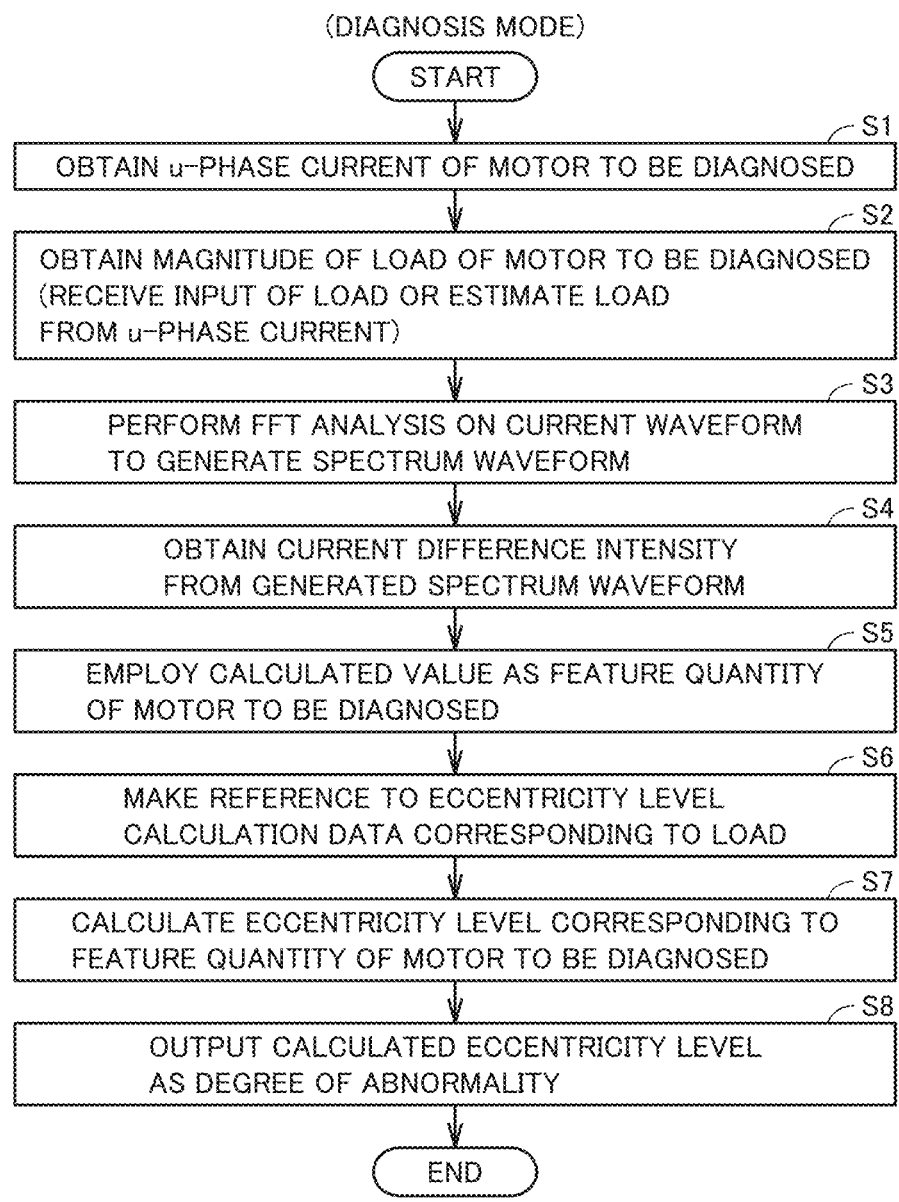
FIG. 6 is a flowchart showing a process procedure of a diagnosis mode.

FIG. 6 is a flowchart showing a process procedure of the diagnosis mode. A process based on this flowchart is executed by processor 101 of abnormality diagnosis device 100. First, processor 101 obtains the u-phase current of motor 10 to be diagnosed (S1).

Next, processor 101 obtains the magnitude of a load of motor 10 to be diagnosed (S2). Processor 101 may obtain the load from input unit 50. Processor 101 may estimate the load in accordance with the u-phase current obtained in S1.

Next, processor 101 performs an FFT analysis on the current waveform to generate a spectrum waveform (S3). Next, processor 101 obtains a current difference intensity from the generated spectrum waveform (S4). Next, processor 101 employs the calculated value as the feature quantity of motor 10 to be diagnosed (S5).

It should be noted that the current difference intensity corresponds to a difference between the frequency component of power supply frequency $f_s$ and the frequency component of rotation frequency $f_i$ of the sideband wave. Processor 101 may employ the "frequency component of rotation frequency $f_i$ of the sideband wave" as the feature quantity instead of the "current difference intensity".

Next, processor 101 makes reference to eccentricity level calculation data corresponding to the load of motor 10 among the data registered in the database (S6). Next, processor 101 calculates the eccentricity level corresponding to the feature quantity of motor 10 to be diagnosed, using the eccentricity level calculation data (S7). Next, processor 101 outputs the calculated eccentricity level to display device 60 as the degree of abnormality (S8), and then ends the process that is based on this flowchart.

For example, the eccentricity level shown in FIG. 5 is displayed as "23%" on display device 60. Display device 60 may display "eccentricity level: 23%", "degree of abnormality: 23%", or "degree of abnormality (eccentricity level): 23%". Further, the degree of abnormality may be displayed in ten levels on display device 60. In this case, it is conceived to display the degree of abnormality in ten levels in such a manner that "1" is indicated when the eccentricity level is 0 to 9%, "2" is indicated when the eccentricity level is 9 to 19%, . . . .

Abnormality diagnosis device 100 according to the present embodiment does not calculate a simple result as to whether or not motor 10 is normal, but calculates a degree of abnormality indicating how high the abnormality is. Therefore, by knowing the degree of abnormality of motor 10, the user can know how high the abnormality is. As a result, the user can perform a quantitative abnormality diagnosis.

(Learning Mode)

Figure 7:
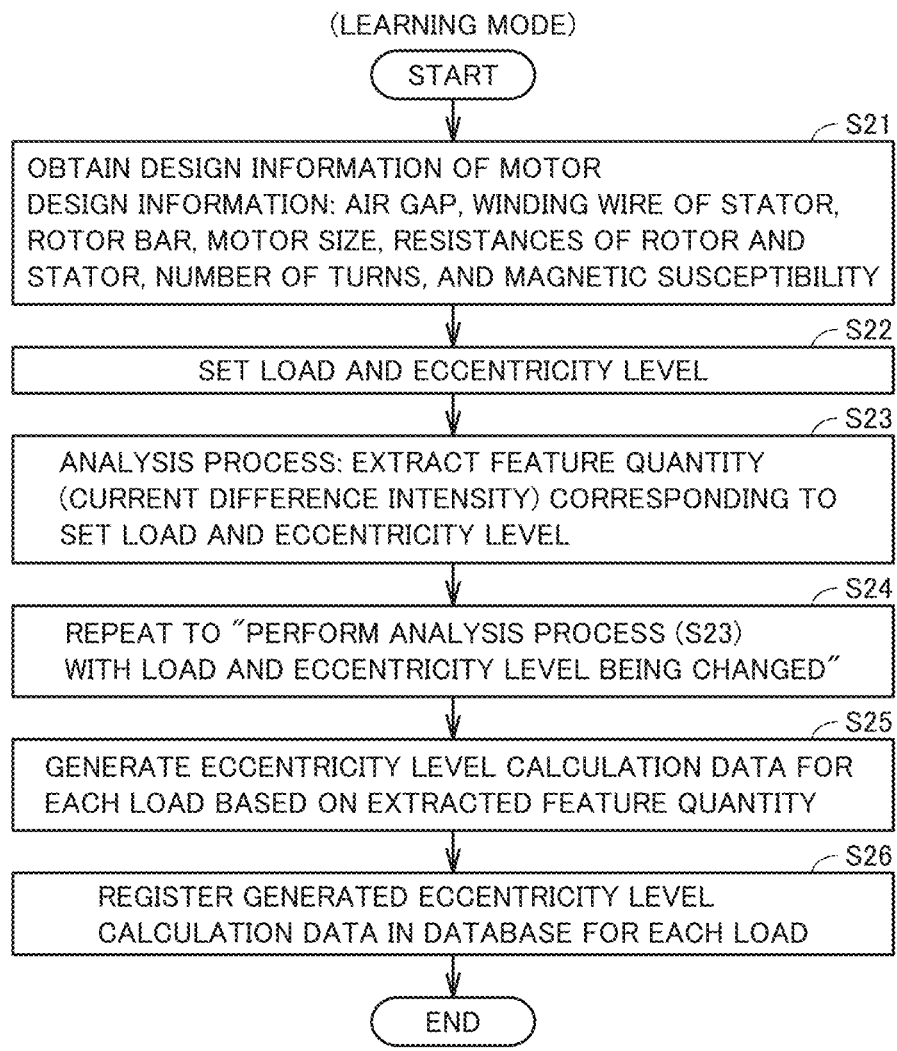
FIG. 7 is a flowchart showing a process procedure of a learning mode.

FIG. 7 is a flowchart showing a process procedure of the learning mode. A process based on this flowchart is executed by processor 101 of abnormality diagnosis device 100. First, processor 101 obtains the design information of motor 10 from input unit 50 (S21). The design information includes air gap 19 of motor 10, winding wire 14 of stator 12, rotor bar 13, the motor size, the resistances of rotor 11 and stator 12, the number of turns, and the magnetic susceptibility. Here, the size of motor 10 means the radius (R) or thickness (l) of the motor. The motor size is utilized when calculating the self-inductance of the winding wire of the stator.

In order to improve calculation precision, processor 101 desirably obtains all of these pieces of design information.

However, processor 101 may perform calculation using part of these pieces of design information. That is, processor 101 may calculate the feature quantity using the information of the size of motor 10, part or whole of winding wire 14 of stator 12 of motor 10, and the air gap size of motor 10.

Next, processor 101 sets the load of motor 10 and the eccentricity level (S22).

Next, processor 101 performs an analysis process (S23). Thus, a feature quantity corresponding to the set load and eccentricity level is extracted. In the present embodiment, the current difference intensity is employed as the feature quantity. The current difference intensity corresponds to a difference between the frequency component of the power supply frequency and the frequency component of the rotation frequency of the sideband wave. Instead of the current difference intensity, processor 101 may employ the rotation frequency component of the current as the feature quantity.

Next, processor 101 repeats to "perform the analysis process (S23) with the load and the eccentricity level being changed" (S24). Next, processor 101 generates eccentricity level calculation data for each load based on the extracted feature quantity (S25). Thus, the data indicating the relation between the feature quantity (current difference intensity) and the eccentricity level, that is, the eccentricity level calculation data is generated for each load.

Next, processor 101 registers the generated eccentricity level calculation data in the database for each load (S26), and ends the process that is based on this flowchart.

Processor 101 performs S24 to set the load and eccentricity level in various manners, thereby extracting feature quantities. As a result, current difference intensities corresponding to the various eccentricity levels are calculated. In other words, the coordinates (eccentricity levels and current difference intensities) of the function shown in the graph of FIG. 5 are found as calculation points. The current difference intensity is continuously changed with respect to the eccentricity level. Therefore, it is desirable to calculate a larger number of calculation points, and to register, in the database as the eccentricity level calculation data, a precise function generated using the larger number of calculated calculation points.

However, as the number of calculation points is increased, a time required to generate the eccentricity level calculation data becomes longer. Therefore, in order to reduce the time, after a certain number of calculation points are obtained, a function generated by performing linear interpolation between the calculation points may be registered in the database as the eccentricity level calculation data. It should be noted that any interpolation method may be employed as long as the continuity of the function can be ensured.

By performing S24, processor 101 sets the loads of various sizes, and generates the eccentricity level calculation data for each load. Since the load is changed, the slip of the current and the rotation frequency, power supply frequency component, and rotation frequency component resulting from the slip are changed. For this reason, in the present embodiment, the eccentricity level calculation data is generated for each load. For the load, a value assumed when driving motor 10 needs to be set. When the load is changed during the driving of the motor, the calculation may be performed with a load that takes only a specific condition used during diagnosis into consideration, such as a condition in which a ratio of driving is large.

In the present embodiment, the eccentricity level calculation data is generated for each load. However, instead of generating the eccentricity level calculation data for each load, the eccentricity level calculation data may be generated for each current amplitude, and the generated eccentricity level calculation data may be registered in the database for each current amplitude. When such eccentricity level calculation data is employed in the diagnosis mode, processor 101 may specify the current amplitude when motor 10 is being driven, and may calculate the degree of abnormality of motor 10 using the eccentricity level calculation data corresponding to the specified current amplitude.

(Construction of Database)

In order to construct the database shown in FIG. 2, it is necessary to generate the eccentricity level calculation data. For this purpose, it is necessary to obtain the relation between the rotation frequency component of the driving current of motor 10 and the eccentricity level. Two methods are conceivable as a method of obtaining the relation between the rotation frequency component of the driving current of motor 10 and the eccentricity level. One method is to actually change the eccentricity level of motor 10 variously and measure the current value for each eccentricity level. The other method is to perform simulation (calculation) using the design information of the motor and the eccentricity level. The eccentricity level calculation data may be generated using either of the methods. Here, the latter method, i.e., the simulation method will be described.

As the simulation method, there is a method of obtaining the current value by calculating inductance using a winding function. The winding function is a function indicating an electrical angle dependency of the number of turns with regard to rotor bar 13 and winding wire 14 of stator 12 through which current flows. As already shown in FIG. 3, as motor 10 is driven, the positional relation between rotor bar 13 and winding wire 14 is changed. Since the positional relation between rotor bar 13 and winding wire 14 is changed, inductance between rotor bar 13 and winding wire 14 is changed. As the inductance is changed, the current value is changed.

By calculating the inductance that is changed over passage of time, time dependency of the current can be found. When eccentricity occurs in motor 10, air gap 19 between rotor 11 and stator 12 is changed. As air gap 19 is changed, the inductance is changed. Therefore, by calculating the inductance when air gap 19 is changed due to the occurrence of eccentricity, the change in current value due to the eccentricity can be found.

As already exemplified, the design information of the motor used in the simulation represents the air gap, the winding wire of the stator, the rotor bar, the motor size, the resistances of the motor and the stator, the number of turns, the magnetic susceptibility, and the like. Although it is desirable to use all of these pieces of information for the simulation, the simulation may be performed using only part of these pieces of information.

Figure 8:
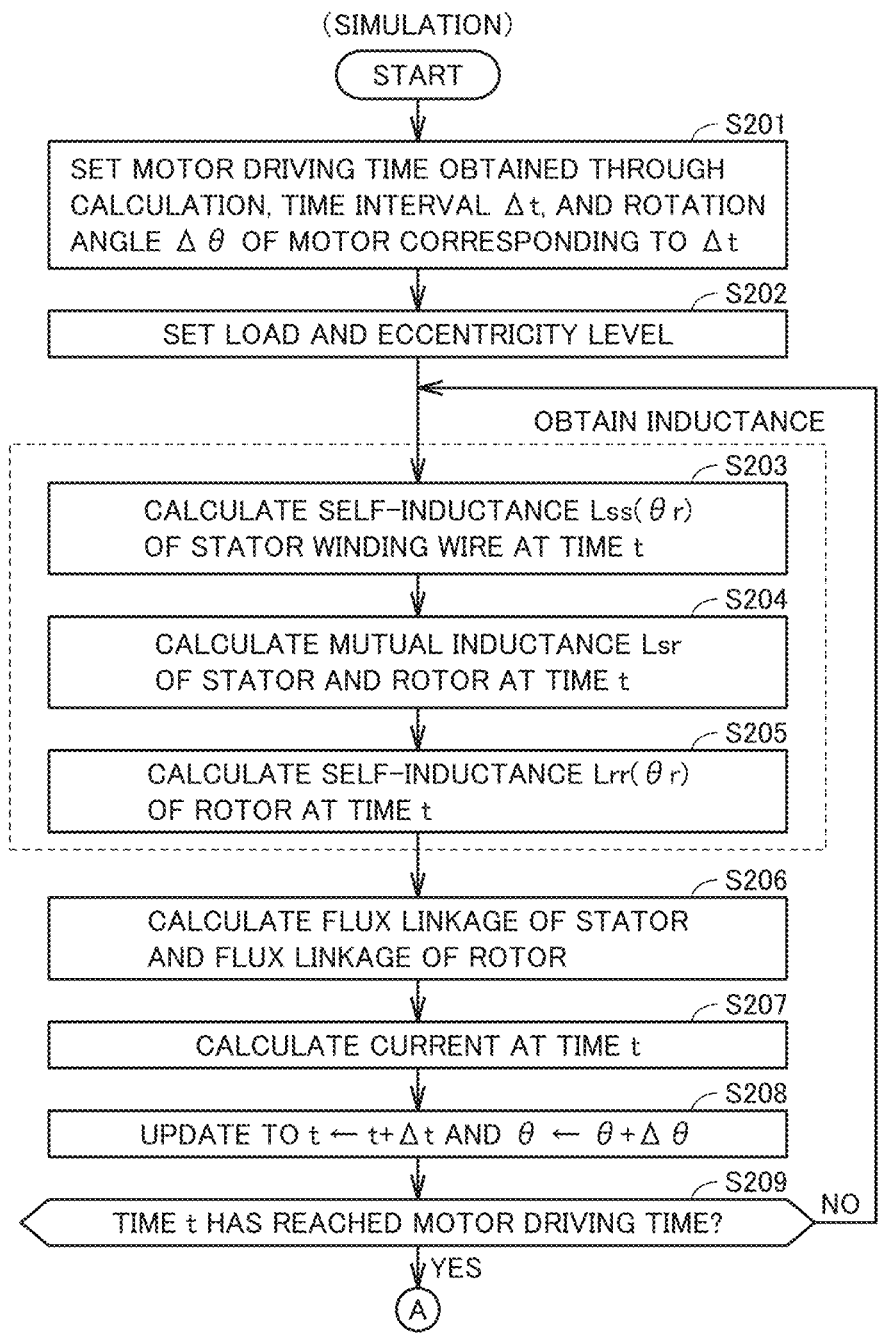
FIG. 8 is a flowchart showing a procedure when generating the eccentricity level calculation data by simulation.
Figure 9:
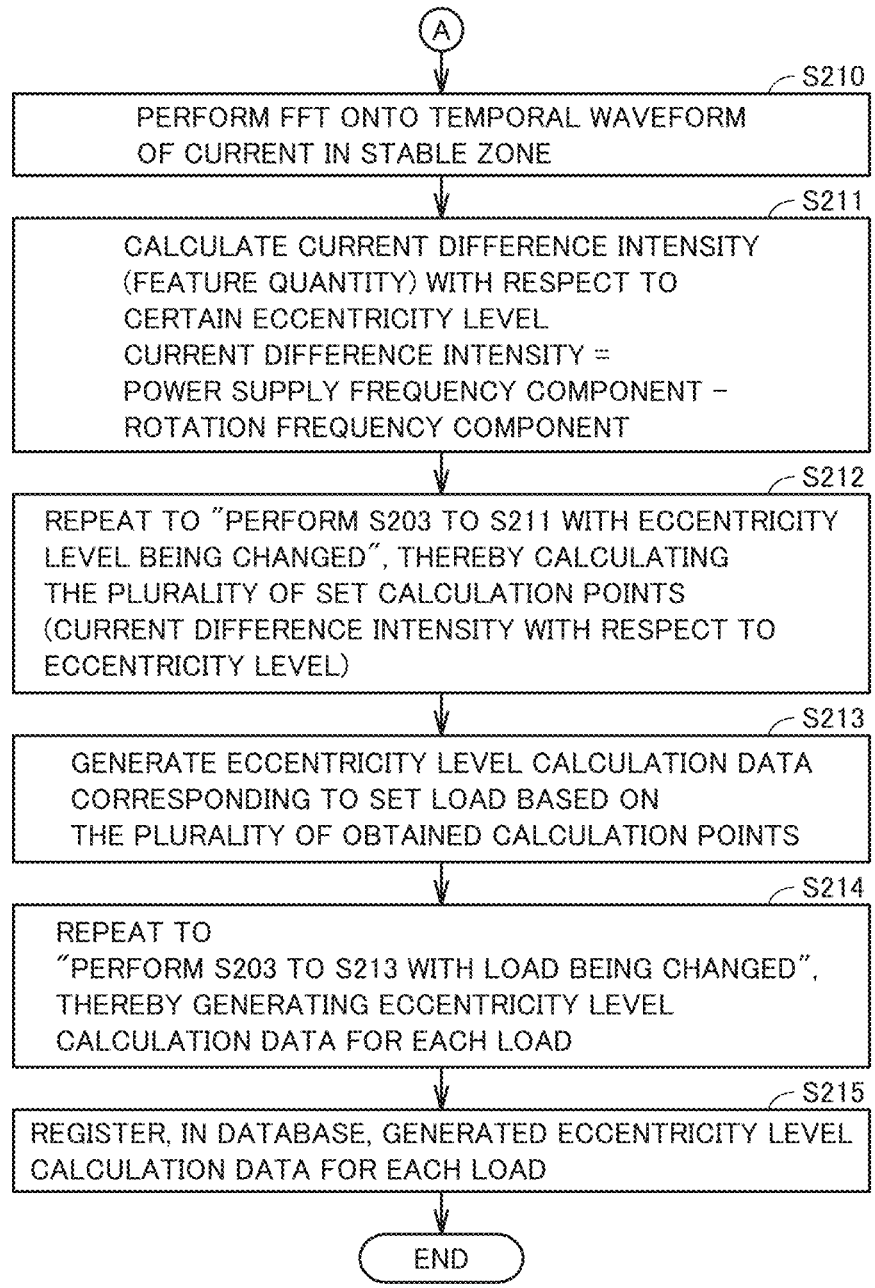
FIG. 9 is a flowchart showing a procedure when generating the eccentricity level calculation data by simulation.

An actual calculation method by the simulation will be described. Each of FIGS. 8 and 9 is a flowchart showing a procedure when generating the eccentricity level calculation data by the simulation. A process based on this flowchart is executed by processor 101 of abnormality diagnosis device 100. In each of the below-described calculation formulas, symbols in italic and bold font all represent vectors.

First, processor 101 sets a motor driving time obtained through calculation, a time interval $\Delta t$, and a rotation angle $\Delta \theta$ of the motor corresponding to $\Delta t$ (S201). The motor driving time obtained through calculation is a time during which motor 10 is continuously driven. The time interval is a time $\Delta t$ per step. For the process, it is necessary to set an initial angle. However, since an influence of the initial angle on the result becomes smaller with passage of time of the simulation, it is not necessary to strictly set the value of the initial angle.

When calculating the frequency domain of the current, the value of the current to be converted in frequency is extracted only from among currents in a stable state. Therefore, the motor driving time is desirably set to a total time of a time required for the frequency conversion and a time required for start-up. Time interval $\Delta t$ is associated with the upper limit of the frequency conversion and the calculation precision. Since the rotation frequency to which reference is made herein is only a low frequency of 90 Hz or less, when the diagnosis is performed using the rotation frequency component, an interval allowing for sufficient calculation precision may be set.

Next, processor 101 sets each of the load and the eccentricity level to one of a plurality of values (S202).

By defining a gap $g(\varphi,\theta_r)$ as described in the following formula (3), the eccentricity level can be set to any value.

$$g(\varphi,\theta_r)=K_c^* g_0 - g_0^* \Delta SE \cos \varphi - g_0^* \Delta DE \cos(\varphi-\theta_r) \qquad (3)$$

In the formula, $\Delta SE$ represents a static eccentricity level and $\Delta DE$ represents a dynamic eccentricity level, and these values are separately input. $K_c$ represents a Carter's coefficient. It is desirable to calculate the Carter's coefficient in consideration of magnetic saturation.

Next, processor 101 calculates self-inductance $L_{ss}(\theta_r)$ of the stator winding wire at a time t (S203).

Self-inductance $L_{ss}(\theta_r)$ of the stator winding wire at a certain time is calculated by the following formula (4):

$$L_{ss}(\theta_r) = \mu_0 Rl \int_0^{2\pi} \frac{n_s(\varphi, \theta_r) M_s(\varphi, \theta_r)}{g(\varphi, \theta_r)} d\varphi \qquad (4)$$

Here, μ0, R, and l represent the magnetic permeability of air, the radius of the rotor, and the thickness of the rotor, respectively. $\theta_r$ and $\varphi$ represent the rotation angle of the motor and an angle indicating an outer peripheral position of the rotor, respectively. $n_s$ represents the winding function of the stator, and g represents the air gap for each rotation angle. $M_s$ represents the winding function of the stator after correcting imbalance of the magnetic flux density caused by the eccentricity. $M_s$ is calculated in accordance with the following formula (5) to satisfy the Gauss's law:

$$M_s(\varphi,\theta_r) = n_s(\varphi,\theta_r) - (M_s(\theta_r)) \qquad (5)$$

The stator inductance is calculated by the above process.

Next, processor 101 calculates a mutual inductance Lsr of the stator and the rotor at time t (S204).

Mutual inductance Lsr of the stator and the rotor is calculated in accordance with the following formula (6):

$$L_{sr}(\theta_r) = \mu_0 Rl \int_0^{2\pi} \frac{n_{r,k}(\varphi, \theta_r) M_s(\varphi, \theta_r)}{g(\varphi, \theta_r)} d\varphi \qquad (6)$$

Here $n_{r,k}$ represents the winding function of the rotor. Here, it is defined that one rotor bar occupies an angle of $2\pi/n_{bar}$, and a winding wire is present only for that portion. In view of such a fact that the rotor bar is rotated at $\theta_r$, dependency of winding function $n_{r,k}$ corresponding to the k-th rotor bar on angle $\varphi$ is defined by the following formulas (7) and (8):

$$n_{r,k} = 1\left(\frac{2(k-1)}{n_{bar}}\pi + \theta_r < \varphi < \frac{2k}{n_{bar}}\pi + \theta_r\right) \qquad (7)$$

$$n_{r,k} = 0\left(\varphi < \frac{2(k-1)}{n_{bar}}\pi + \theta_r, \frac{2k}{n_{bar}}\pi + \theta_r < \varphi\right) \qquad (8)$$

Next, processor 101 calculates self-inductance $L_{rr}(\theta_r)$ of the rotor at time t (S205). When the number of rotor bars is represented by $n_{bar}$, $L_{rr}(\theta_r)$ is a matrix of $(n_{bar}+1)\times(n_{bar}+1)$ and is defined as in the following formula (9):

$$L_{rr}(\theta_r) = L_{rr1} + \begin{bmatrix} L_{rr2} & L_{rr3} \\ L_{rr4} & n_{bar}L_e \end{bmatrix} \qquad (9)$$

The matrices on the right-hand side of the formula (9) are as in the following formulas (10), (11), (12), and (13):

$$L_{rr1}(\theta_r) = \mu_0 Rl \int_0^{2\pi} \frac{M_{r,j}(\varphi, \theta_r) n_{r,k}(\varphi, \theta_r)}{g(\varphi, \theta_r)} d\varphi \qquad (10)$$

$$L_{rr2} = L_{rra} + L_{rrb} + L'_{rrb} + L_{rrc} + L'_{rrc} \qquad (11)$$

$$L_{rr3} = \begin{pmatrix} -L_e \\ -L_e \\ \vdots \\ -L_e \\ -L_e \end{pmatrix} \qquad (12)$$

$$L_{rr4} = (-L_e \quad -L_e \quad \ldots \quad -L_e \quad -L_e) \qquad (13)$$

Further, $L_{rra}$, $L_{rrb}$, and $L_{rrc}$ satisfy the following formulas (14), (15), and (16):

$$L_{rra} = \begin{pmatrix} 2(L_b+L_e) & 0 & & & \\ 0 & 2(L_b+L_e) & \ldots & & \\ \vdots & & \ddots & & \vdots \\ & & \ldots & 2(L_b+L_e) & 0 \\ & & & 0 & 2(L_b+L_e) \end{pmatrix} \qquad (14)$$

$$L_{rrb} = \begin{pmatrix} 0 & -L_b & 0 & & & \\ 0 & 0 & -L_b & \ldots & & \\ 0 & 0 & 0 & & & \\ \vdots & & & \ddots & & \vdots \\ & & & 0 & -L_b & 0 \\ & & \ldots & 0 & 0 & -L_b \\ & & & 0 & 0 & 0 \end{pmatrix} \qquad (15)$$

$$L_{rrc} = \begin{pmatrix} 0 & 0 & 0 & & & \\ -L_b & 0 & 0 & \ldots & & \\ 0 & -L_b & 0 & & & \\ \vdots & & & \ddots & & \vdots \\ & & & 0 & 0 & 0 \\ & & \ldots & -L_b & 0 & 0 \\ & & & 0 & -L_b & 0 \end{pmatrix} \qquad (16)$$

Here, Le and Lb represent the leakage inductance of the end ring and the leakage inductance of the rotor bar, respectively.

$M_{r,j}$ was calculated as in the following formula (18) using $\langle M_{r,j}(\theta_r)\rangle$ that satisfies the following formula (17):

$$\langle M_{r,j}(\theta_r)\rangle = \frac{1}{2\pi\langle g^{-1}\rangle}\int_0^{2\pi}\frac{n_{r,k}(\varphi,\theta_r)}{g(\varphi,\theta_r)}d\varphi \tag{17}$$

$$M_{r,j}(\varphi,\theta_r) = n_{r,j}(\varphi,\theta_r) - \langle M_{r,j}(\theta_r)\rangle \tag{18}$$

The calculation of the inductance is completed by S203 to S205 above. Next, processor 101 calculates the current value using the calculated inductance and flux linkages. Therefore, processor 101 calculates a flux linkage $\Lambda_s$ of stator 12 and a flux linkage $\Lambda_r$ of rotor 11 (S206). It should be noted that instead of the inductance, the current value may be calculated using reactance and the flux linkages.

Each of the flux linkages is calculated through a differential equation for voltage, current, and resistance. The differential equation is solved using numerical calculation. As an example, differential equations using the Euler's method are shown in the following formulas (19) and (20):

$$\Lambda_s(t) = \Lambda_s(t-\Delta t) + (V_s - R_s I_s(t-\Delta t))\Delta t \tag{19}$$

$$\Lambda_r(t) = \Lambda_r(t-\Delta t) - R_r I_r(t-\Delta t))\Delta t \tag{20}$$

The flux linkages are calculated by the above formulas (19) and (20). In the formula (19), Vs represents an applied voltage. In the three-phase induction machine, applied voltage Vs is represented by a matrix of 3 rows×1 column. $R_s$ and $R_r$ respectively represent a stator resistance matrix of 3 rows×3 columns and a rotor resistance matrix of $(n_{bar}+1)\times(n_{bar}+1)$, and are respectively calculated from the resistances of stator 12 and rotor bar 13. $\Delta t$ represents a time per step in the simulation.

A relation represented by the following formula (21) is established between obtained flux linkage $\Lambda$ and matrix $L_{line}$ obtained from the inductance:

$$\Lambda = L_{line}I \tag{21}$$

Thus, processor 101 can calculate current I at each time using the formula (21) (S207). In the above steps (S202 to S207), one step of calculation is completed, thereby calculating the current value at certain time t.

Next, processor 101 updates t and $\theta$ (S208). Since the inductance depends on rotation angle $\theta$ of the motor, in the calculation of the next step, rotation angle $\Delta\theta$ per step is updated to $\theta + \Delta\theta$, and the calculation is repeated with the updated rotation angle. A rotation angle $\omega$ is required to calculate $\Delta\theta$. $\omega$ is calculated from the motor torque, the load torque, friction/viscosity coefficient, and the inertia of the motor.

In order to precisely calculate $\omega$, processor 101 desirably obtains all of these precise parameter values. However, when there is an unknown parameter among these parameters, a suitable parameter value may be input to processor 101. By using the inductance, a precise value of the motor torque can be found. Therefore, among the plurality of parameters, the motor torque is desirably calculated using the inductance.

Next, processor 101 determines whether or not time t has reached the motor driving time set in S201 (S209). When time t has not reached the motor driving time, processor 101 returns to S203, and repeats the process of S203 and subsequent processes. Thus, the temporal waveform of the current is obtained.

When time t has reached the motor driving time, it is considered that processor 101 has calculated the current value for each small amount of time required for FFT.

Therefore, when time t has reached the motor driving time, processor 101 performs FFT onto the temporal waveform of the current (S210). On this occasion, processor 101 extracts a current in a zone in which the current value is stable with passage of time from the start-up of the obtained current, and performs the FFT onto the temporal waveform of the current in the stable zone.

Next, processor 101 calculates a current difference intensity (feature quantity) with respect to a certain eccentricity level (S211). Here, the current difference intensity is calculated as follows: "the current difference intensity=the power supply frequency component—the rotation frequency component". By performing the process up to S211, one of the calculation points of the function shown in the graph of FIG. 5 is calculated.

Next, processor 101 repeats to "perform steps S203 to S211 with the eccentricity level being changed", thereby calculating the plurality of set calculation points (the current difference intensities with respect to the eccentricity levels) (S212). Next, processor 101 generates the eccentricity level calculation data corresponding to the set load based on the plurality of obtained calculation points (S213). Next, processor 101 repeats to "perform S203 to S213 with the load being changed", thereby generating the eccentricity level calculation data for each load (S214).

Next, processor 101 registers, in the database, the generated eccentricity level calculation data for each load (S215), and then ends the process that is based on this flowchart.

As described above, in this process, processor 101 extracts the rotation frequency component and the power supply frequency component, and calculates the difference therebetween, thereby obtaining the current difference intensity. Processor 101 repeatedly performs these processes with the load and eccentricity level being changed, thereby generating eccentricity calculation data indicating the eccentricity dependency of the current difference intensity for each load. The database is constructed using the generated eccentricity calculation data.

Second Embodiment

Figure 10:
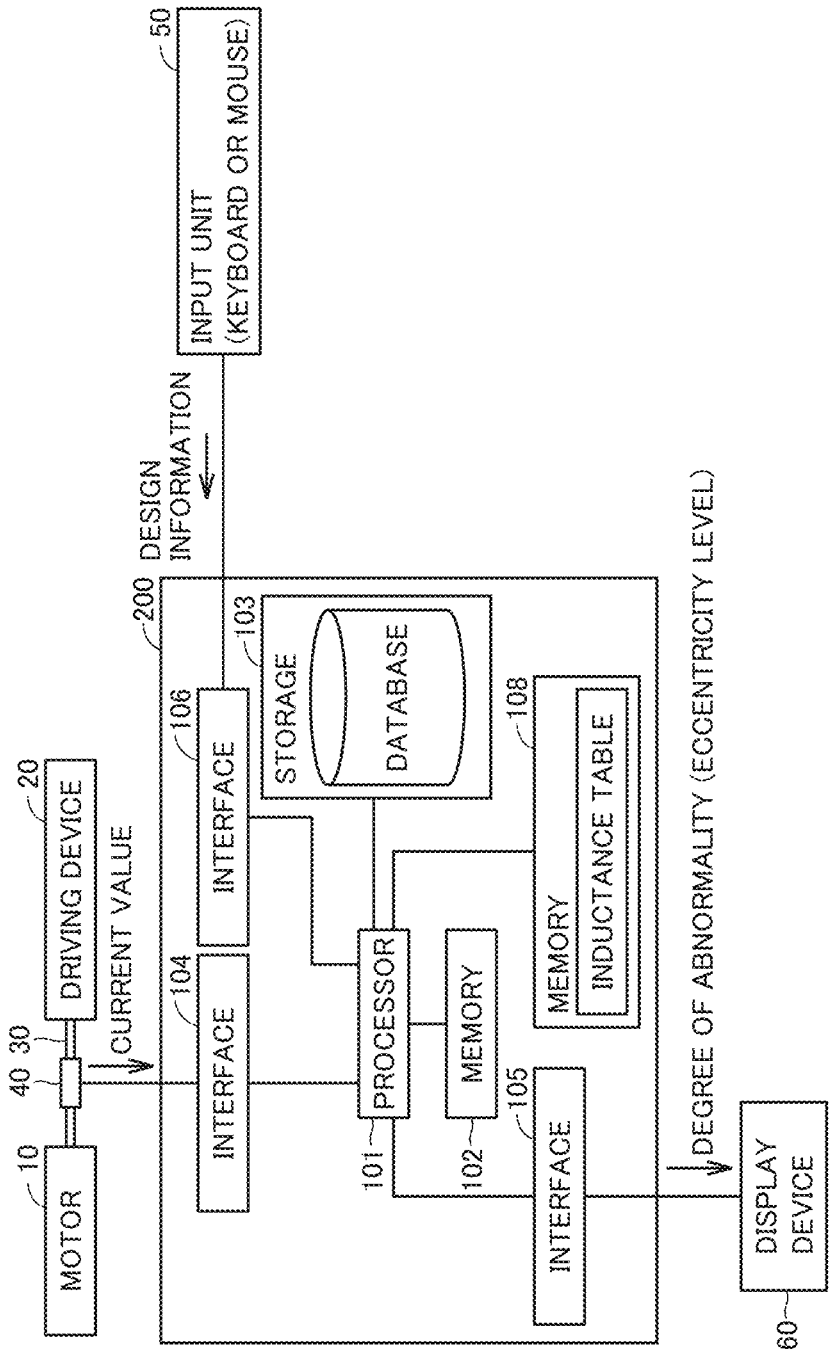
FIG. 10 is a block diagram showing a configuration of an abnormality diagnosis device according to a second embodiment.

Next, a second embodiment will be described with reference to FIG. 10. FIG. 10 is a block diagram showing a configuration of an abnormality diagnosis device 200 according to the second embodiment. Abnormality diagnosis device 200 according to the second embodiment is different from abnormality diagnosis device 100 according to the first embodiment in that abnormality diagnosis device 200 further includes a memory 108 that stores an inductance table. In the other points, abnormality diagnosis device 200 is the same as abnormality diagnosis device 100.

An inductance value serving as the calculation result of S203 to S205 in FIG. 8 is included in the inductance table in advance. The process of obtaining the inductance includes a complicated integral calculation. Moreover, in the simulation, it is necessary to repeatedly perform the integral calculation under a plurality of conditions of loads and eccentricity levels (S209, S212, and S214). Therefore, in the simulation, calculation cost for obtaining the inductance is large.

Therefore, in abnormality diagnosis device 200 according to the second embodiment, the value of the inductance is read from the inductance table in order to reduce the calculation cost. The inductance table includes an inductance value for each eccentricity level and rotation angle. Processor 101 performs a process to make reference to the inductance table instead of S203 to S205 in FIG. 8, thereby obtaining the inductance without performing the complicated integral calculation. According to the second embodiment, the calculation cost can be reduced.

When the inductance table has no data of the eccentricity level and rotation angle desired to be obtained, processor 101 may obtain, from the inductance table, data close to the eccentricity level and rotation angle desired to be obtained, and may use the obtained data by applying an interpolation process to the obtained data. Processor 101 may store the previously created inductance table in memory 108. Alternatively, an inductance table created by a computer different from abnormality diagnosis device 200 may be stored in memory 108.

Third Embodiment

Figure 11:
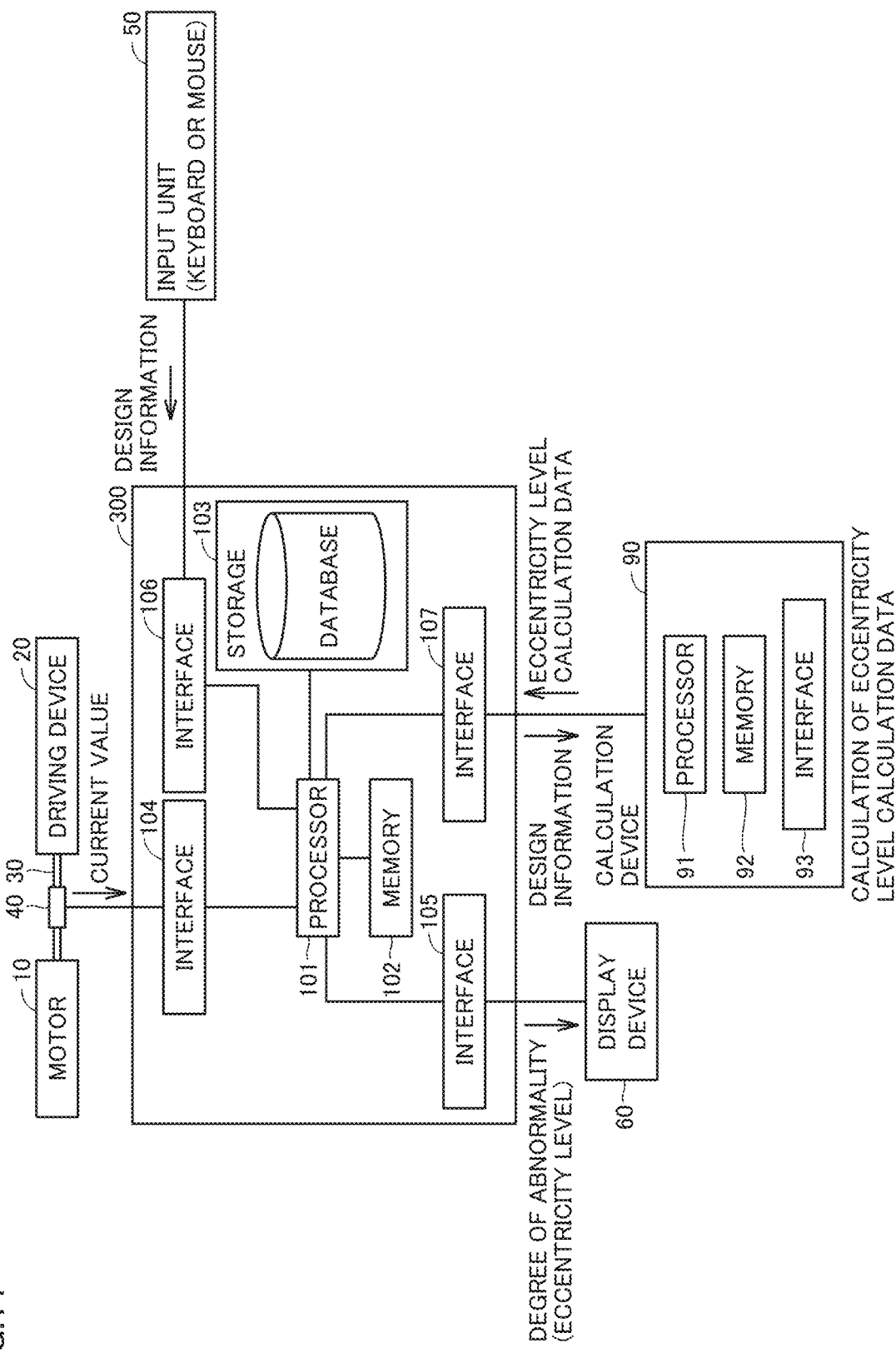
FIG. 11 is a block diagram showing a configuration of an abnormality diagnosis device according to a third embodiment.

Next, a third embodiment will be described with reference to FIG. 11. FIG. 11 is a block diagram showing a configuration of an abnormality diagnosis device 300 according to the third embodiment. Abnormality diagnosis device 300 according to the third embodiment is different from abnormality diagnosis device 100 according to the first embodiment in that the database is constructed by an external calculation device 90. Therefore, abnormality diagnosis device 300 includes an interface 107 to communicate with calculation device 90. In the other points, abnormality diagnosis device 300 is the same as abnormality diagnosis device 100.

Calculation device 90 includes a processor 91, a memory 92, and an interface 93. Processor 91 and memory 92 of calculation device 90 have configurations corresponding to those of processor 101 and memory 102 of abnormality diagnosis device 100, respectively. However, processor 91 and memory 92 of calculation device 90 have significantly higher performances than those of processor 101 and memory 102 of abnormality diagnosis device 100.

An amount of calculation for current waveform in the simulation described with reference to FIGS. 8 and 9 is very large. For this reason, depending on a calculation capacity, it may be difficult to perform the calculation of the simulation in the abnormality diagnosis device itself. Therefore, in abnormality diagnosis device 300 according to the third embodiment, information necessary for the simulation, such as the design information of motor 10, is transmitted to calculation device 90 having a large calculation capacity.

Calculation device 90 performs the simulation shown in FIGS. 8 and 9 based on the information provided from abnormality diagnosis device 300. Calculation device 90 transmits, to abnormality diagnosis device 300, the eccentricity level calculation data generated by performing the simulation. Abnormality diagnosis device 300 registers the received eccentricity level calculation data in the database of storage 103.

In the third embodiment, an abnormality diagnosis system is constructed by abnormality diagnosis device 300 and calculation device 90. Interface 107 and calculation device 90 may be connected to each other via a communication network such as the Internet. Abnormality diagnosis device 300 may leave, to calculation device 90, a process involving a large calculation load such as the process for calculating the inductance, rather than all the calculations of the simulation. That is, abnormality diagnosis device 300 and calculation device 90 may perform the simulation process in cooperation with each other.

In each embodiment, instead of constructing the database in storage 103, the database may be constructed on a cloud. Each of abnormality diagnosis devices 100 to 300 may access the database on the cloud via a communication network such as the Internet.

In each embodiment, the inductance is calculated to determine the current value. However, instead of the inductance, reactance may be calculated to obtain the current value.

Each of the embodiments can be implemented in any of a multiplicity of manners. For example, the embodiments described above can be implemented using hardware, software, or a combination thereof. When implemented by software, a software code may be executed on any suitable processor provided on a single computer or collection of processors distributed over a plurality of computers. Each of such processors may be implemented as an integrated circuit including one or more processors within an integrated circuit component. However, the processor may be implemented using a circuit in any suitable format.

Further, the various methods or processes generally described in each embodiment may be encoded as software executable on one or more processors employing any one of various operating systems or platforms. In addition, such software may be written using any of some suitable programming languages, programming tools, or script tools, and may be compiled as executable machine language code or intermediate code running on a framework or virtual machine. Typically, functionalities of a program module may be combined or distributed as desired in various embodiments.

Further, each embodiment may be embodied as a method in which an example thereof is provided. Operations performed as part of the method may be ordered in any suitable manner. Thus, even when operations are indicated as continuous operations in an illustrative embodiment, an embodiment in which the operations are performed in an order different from the order shown in the figures may be constructed. This may include performing several operations simultaneously.

CONCLUSION

The above embodiments will be summarized.

(1) The present disclosure is directed to an abnormality diagnosis device (100) for diagnosing an abnormality of a motor, the abnormality diagnosis device (100) including: a first interface (104) to obtain a value of a driving current for driving the motor; and a processor (101) to access a database including calculation data to be used to calculate a degree of abnormality of the motor, wherein the processor extracts a feature quantity for calculating the degree of abnormality from a current waveform specified by a value of the driving current, and calculates the degree of abnormality of the motor based on the extracted feature quantity and the calculation data (S4 to S7).

According to the present disclosure, information by which how high the abnormality of the motor is can be known can be provided. According to the present disclosure, by calculating the degree of abnormality by which how high the abnormality of the motor is can be known, the user can perform a quantitative abnormality diagnosis.

(2) In the present disclosure, the degree of abnormality includes an eccentricity level of the motor (FIG. 1).

According to the present disclosure, the eccentricity level can be quantitatively calculated.

(3) In the present disclosure, the calculation data is data (FIG. 2) indicating a relation between the eccentricity level and the feature quantity.

According to the present disclosure, an amount of calculation can be reduced by making reference to the database in which the data indicating the relation between the eccentricity level and the feature quantity is registered.

(4) The processor is capable of switching a control mode between a first mode (learning mode) for generating the calculation data and a second mode (diagnosis mode) for calculating the degree of abnormality of the motor, and in the first mode, the processor generates the calculation data by calculating the feature quantity corresponding to the eccentricity level using inductance or reactance of the motor (FIGS. 8 and 9), and registers the generated calculation data in the database.

According to the present disclosure, since precision in calculation of the feature quantity is increased, thereby improving diagnosis precision.

(5) The processor calculates the inductance using the eccentricity level and a positional relation between a winding wire of a stator of the motor and a bar of a rotor of the motor (FIG. 7).

According to the present disclosure, precision in calculation of the feature quantity is increased, thereby improving diagnosis precision.

(6) The abnormality diagnosis device further includes a memory (108) to store the inductance having been calculated, and the processor reads the inductance from the memory.

According to the present disclosure, an amount of calculation can be reduced by reading the inductance from the memory.

(7) The abnormality diagnosis device further includes a second interface (106) to obtain design information of the motor, wherein the processor generates the calculation data by further using the design information obtained by the second interface (FIG. 7).

According to the present disclosure, an amount of calculation can be reduced by making reference to the database in which the data indicating the relation between the eccentricity level and the feature quantity is registered.

(8) The processor calculates the feature quantity corresponding to the eccentricity level by further using information of a size of the motor, part or whole of a winding wire of a stator of the motor, and an air gap of the motor (S21).

According to the present disclosure, precision in calculation of the feature quantity is increased, thereby improving diagnosis precision.

(9) In the present disclosure, the feature quantity is a current difference intensity (S4) of the driving current.

According to the present disclosure, a feature quantity appropriate for quantitative evaluation on eccentricity can be extracted, thereby improving diagnosis precision.

(10) The database includes the calculation data generated for each load or current amplitude of the motor (FIG. 2).

According to the present disclosure, precision in calculation of the feature quantity is increased, thereby improving diagnosis precision.

(11) The processor calculates the degree of abnormality of the motor when the motor is driven with a load or current amplitude of the motor registered in the database (S1).

According to the present disclosure, precision in calculation of the feature quantity is increased, thereby improving diagnosis precision.

(12) The processor estimates a magnitude of the load of the motor from the current waveform (S2).

According to the present disclosure, precision in calculation of the feature quantity is increased, thereby improving diagnosis precision.

(13) The abnormality diagnosis device further includes a storage device (103) including the database.

According to the present disclosure, the abnormality diagnosis device can use the storage device included in the abnormality diagnosis device.

(14) The abnormality diagnosis device further includes a display device (60) to display the degree of abnormality.

According to the present disclosure, the degree of abnormality can be displayed to the user.

(15) The present disclosure is directed to an abnormality diagnosis method for diagnosing an abnormality of a motor by a computer, the abnormality diagnosis method including: obtaining a value of a driving current for driving the motor (S1); accessing a database including calculation data to be used to calculate a degree of abnormality of the motor (S6); and extracting a feature quantity for calculating the degree of abnormality from a current waveform specified by a value of the driving current, and calculating the degree of abnormality of the motor based on the extracted feature quantity and the calculation data (S4, S5, S7).

According to the present disclosure, by calculating the degree of abnormality by which how high the abnormality of the motor is can be known, the user can perform a quantitative abnormality diagnosis.

The embodiments disclosed herein are illustrative and non-restrictive in any respect. The scope of the present disclosure is defined by the terms of the claims, rather than the embodiments described above, and is intended to include any modifications within the scope and meaning equivalent to the terms of the claims.

What is claimed is:

1. An abnormality diagnosis device for diagnosing an abnormality of a motor, the abnormality diagnosis device comprising:
    a first interface to obtain a value of a driving current for driving the motor; and
    a processor to access a database including calculation data to be used to calculate a degree of abnormality of the motor, wherein
    the processor extracts a feature quantity for calculating the degree of abnormality from a current waveform specified by a value of the driving current, and calculates the degree of abnormality of the motor based on the extracted feature quantity and the calculation data,
    the degree of abnormality includes an eccentricity level of the motor, and
    the calculation data is data indicating a relation between the eccentricity level and the feature quantity.

2. The abnormality diagnosis device according to claim 1, wherein
    the processor is capable of switching a control mode between a first mode for generating the calculation data and a second mode for calculating the degree of abnormality of the motor, and
    in the first mode, the processor generates the calculation data by calculating the feature quantity corresponding to the eccentricity level using inductance or reactance of the motor, and registers the generated calculation data in the database.

3. The abnormality diagnosis device according to claim 2, wherein the processor calculates the inductance using the eccentricity level and a positional relation between a winding wire of a stator of the motor and a bar of a rotor of the motor.

4. The abnormality diagnosis device according to claim 2, further comprising a memory to store the inductance having been calculated, wherein
the processor reads the inductance from the memory.

5. The abnormality diagnosis device according to claim 2, further comprising a second interface to obtain design information of the motor, wherein
the processor generates the calculation data by further using the design information obtained by the second interface.

6. The abnormality diagnosis device according to claim 2, wherein the processor calculates the feature quantity corresponding to the eccentricity level by further using information of a size of the motor, part or whole of a winding wire of a stator of the motor, and an air gap of the motor.

7. The abnormality diagnosis device according to claim 1, wherein the feature quantity is a current difference intensity of the driving current.

8. The abnormality diagnosis device according to claim 1, wherein the database includes the calculation data generated for each load or current amplitude of the motor.

9. The abnormality diagnosis device according to claim 8, wherein the processor estimates a magnitude of the load of the motor from the current waveform.

10. The abnormality diagnosis device according to claim 1, wherein the processor calculates the degree of abnormality of the motor when the motor is driven with a load or current amplitude of the motor registered in the database.

11. The abnormality diagnosis device according to claim 1, further comprising a storage device including the database.

12. The abnormality diagnosis device according to claim 1, further comprising a display device to display the degree of abnormality.

13. An abnormality diagnosis method for diagnosing an abnormality of a motor by a computer, the abnormality diagnosis method comprising:
obtaining a value of a driving current for driving the motor;
accessing a database including calculation data to be used to calculate a degree of abnormality of the motor; and
extracting a feature quantity for calculating the degree of abnormality from a current waveform specified by a value of the driving current, and calculating the degree of abnormality of the motor based on the extracted feature quantity and the calculation data, wherein
the degree of abnormality includes an eccentricity level of the motor, and
the calculation data is data indicating a relation between the eccentricity level and the feature quantity.

* * * * *